Jan. 23, 1923.

L. W. BELL.
HOG FEEDER.
FILED APR. 1, 1922.

Inventor
Lorenzo W. Bell,

By Watson E. Coleman
Attorney

Jan. 23, 1923.
L. W. BELL.
Hog Feeder.
Filed Apr. 1, 1922
1,443,203
2 SHEETS-SHEET 2
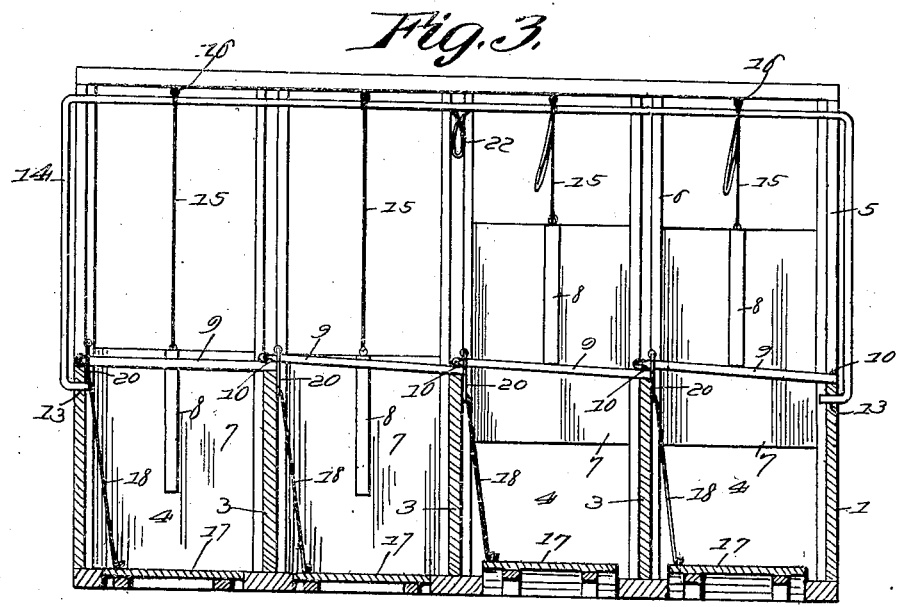
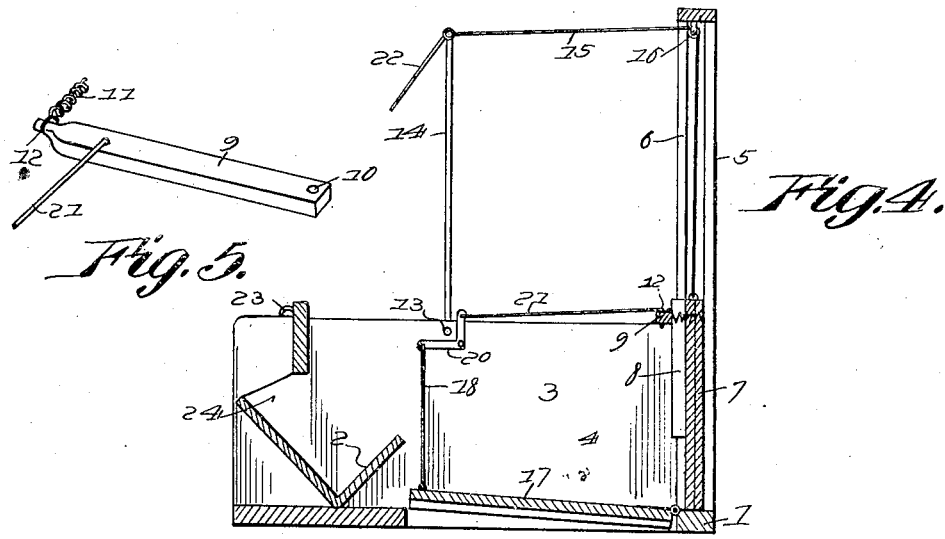
Inventor
Lorenzo W. Bell,
By Watson E. Coleman
Attorney Patented Jan. 23, 1923.

1,443,203

UNITED STATES PATENT OFFICE.

LORENZO W. BELL, OF CARROLLTON, MISSOURI, ASSIGNOR OF ONE-HALF TO WILLIAM H. GATLIN, OF CARROLLTON, MISSOURI.

HOG FEEDER.

Application filed April 1, 1922. Serial No. 548,653.

*To all whom it may concern:*

Be it known that I, LORENZO W. BELL, a citizen of the United States, residing at Carrollton, in the county of Carroll and State of Missouri, have invented certain new and useful Improvements in Hog Feeders, of which the following is a specification, reference being had to the accompanying drawings.

Heretofore there has been no system for equalizing the feed, when feeding animals, such as hogs and the like. It is, therefore, the purpose of the present invention to provide a hog feeder, wherein means are afforded for equalizing the feed for a number of hogs or pigs, particularly young pigs, so as to render the growth and the fattening of the pigs uniform.

It is another purpose to provide a hog feeder, which also conserves the feed, due to the fact that one pig is unable to procure more feed than any one of the other pigs.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in front elevation of the improved feeder constructed in accordance with the invention;

Figure 2 is a plan view of the same;

Figure 3 is a longitudinal sectional view on line 3—3 of Figure 2;

Figure 4 is a transverse sectional view on line 4—4 of Figure 2;

Figure 5 is a detail view of the latch 9.

Referring to the drawings, 1 designates a frame, which may be any suitable proportion, and constructed of any suitable material preferably wood. Mounted in the frame is a feed trough 2, in which the hog feed is deposited. A plurality of partitions 3 divide the frame into a plurality of compartments or stalls 4. Since the frame may be any suitable proportions, in fact any length, any number of stalls or compartments may be provided.

An auxiliary frame 5 rises from the rear of the main frame 1, and includes a plurality of guides 6, two oppositely disposed guides for each stall or compartment. Mounted in the guides 6 are sliding doors 7, and secured to their faces are elongated web-shaped catches 8, over the faces of which the latches 9 engage, as the doors are raised so that when the doors reach their uppermost positions the lower ends of the catches will engage upon the latches. These latches 9 are pivoted at 10 upon the upper edges of corresponding partitions, which cause the stalls of compartments to be formed. The latches 9 are under tension of the springs 11, which connect to the auxiliary frame, and are in turn connected to the free ends of the latches as at 12. The springs hold the latches against the faces of the web-shaped catches which are carried by the doors.

Pivotally mounted as at 13 on the ends of the frame 1 is a bail shaped lever 14, to which a plurality of ropes or cords, chains or the like 15 are connected. These chains or cords 15 pass over pulleys 16, which are suspended from the upper rail of the auxiliary frame 5 directly over the upper ends of the elongated web-shaped catches of the doors. The ropes or cords are in turn connected to the upper ends of the web-shaped catches so that when the bail shaped lever 14 is moved downwardly toward the front face of the hog feeder, the doors 7 will be raised vertically in their guides until the lower ends of the catches are above the latches, and then the springs 11 will restore the latches to their normal positions, under the lower ends of the catches of the doors, thereby holding the doors supported in raised positions. When the doors are so raised the compartments or stalls are free to be entered by the pigs or other animals, for the purpose of procuring their feed.

Hingedly mounted adjacent the entrances to the stalls or compartments are trip members 17, to which the rods 18 are pivotally connected. These rods are in turn pivotally connected at 10 to bell crank levers 20, which are pivotally mounted on the inner faces of corresponding sides of the stalls or compartments. Each bell crank lever 20 is in turn operatively connected to one of the latches 9 by means of a link 21. A suitable loop hasp 22 is carried by the bail lever, and when the bail lever is moved toward and adjacent the forward part of the main frame, the hasp 22 engages a keeper 23, holding said lever in position and the doors 7 raised. Each partition has an extension 24 which extends into the trough. Obviously these extensions also subdivide the trough 2 into compartments. The feed is supplied to the various compartments of the trough, equal amounts in all of them, and obviously when the pigs or other animals enter the compartments, their weight impart downward movement to the trips 17, which cause the bell crank levers to tilt, and thereby move the latches 9 from engagement with the lower ends of the catches 8. However, when the doors 7 are open, and the compartments of the trough are filled, the bail lever is released and allowed to assume a vertical position. The weight of the animal on the trip 17 in each compartment disengages the latch 9 from the catch, and the door 7 of such compartment lowers, thereby retaining the pig or other animal in the compartment until it has received its requisite amount of feed. The pigs are unable to procure any more than their share of the feed, for the various compartments of the trough are supplied with equal quantities of feed.

The invention having been set forth, what is claimed is:—

1. In a hog feeder, a main frame including a plurality of animal stalls and feed troughs, an auxiliary frame rising from the main frame, doors mounted in guides of the auxiliary frame, animal actuated means for supporting the doors in raised or open positions, and being individually actuated, whereby each means may be individually released to cause its door to automatically close, and means for raising the doors simultaneously.

2. In a hog feeder, a main frame having a plurality of stalls and a plurality of feed troughs, one for each stall, an auxiliary frame rising from the main frame, doors mounted in guides of the auxiliary frame, each having a catch, a spring tensioned latch to engage its respective catch to hold a door raised, and a plurality of animal actuated trips for actuating the latches individually, causing them to disengage their respective catches, said latches being pivoted on the partitions between the stalls and extending transversely of the stalls, and springs tensioning said latches, and means for raising the plurality of doors simultaneously.

In testimony whereof I hereunto affix my signature.

LORENZO W. BELL.